United States Patent [19]

Widmyer

[11] Patent Number: 5,337,698
[45] Date of Patent: Aug. 16, 1994

[54] FISH FEEDING SYSTEM

[75] Inventor: Ronald L. Widmyer, Charles Town, W. Va.

[73] Assignee: Federal Hill Farm, Inc., Charles Town, W. Va.

[21] Appl. No.: 29,600

[22] Filed: Mar. 11, 1993

[51] Int. Cl.⁵ .............................................. A01K 61/02
[52] U.S. Cl. .................................. 119/51.04; 119/230; 119/57.92; 222/650
[58] Field of Search ................ 119/51.03, 51.11, 51.13, 119/3, 57.92, 230; 222/650, 638, 639, 63

[56] References Cited

U.S. PATENT DOCUMENTS

| | | |
|---|---|---|
| 742,414 | 10/1903 | Hale . |
| 742,415 | 10/1903 | Hale . |
| 848,101 | 3/1907 | Hale . |
| 2,858,799 | 11/1958 | Krauss et al. . |
| 2,800,256 | 7/1957 | Di Nuzzo . |
| 2,847,066 | 4/1955 | Kleiber et al. . |
| 3,022,767 | 2/1962 | Malek . |
| 3,029,790 | 4/1962 | Loudon . |
| 3,050,029 | 8/1962 | Appleton . |
| 3,113,556 | 12/1963 | Jarvis . |
| 3,140,693 | 6/1963 | Kaunzner . |
| 3,368,529 | 2/1968 | Ferris . |
| 3,528,588 | 6/1968 | Moore . |
| 3,605,697 | 7/1969 | Szekely . |
| 3,665,224 | 5/1972 | Kelsey . |
| 3,717,125 | 2/1973 | Sanders . |
| 4,027,627 | 7/1977 | Fillion . |
| 4,200,826 | 4/1980 | Calusio . |
| 4,279,220 | 7/1981 | Kukurba . |
| 4,359,014 | 11/1982 | Molaug et al. ............ 119/51.04 |
| 4,437,595 | 3/1984 | Stevens et al. . |
| 4,491,086 | 1/1985 | Croteau . |
| 4,628,864 | 12/1986 | Smeltzer . |
| 4,699,087 | 10/1987 | Mori ........................... 119/3 |
| 4,722,300 | 2/1988 | Walker et al. . |
| 4,949,674 | 8/1990 | Young . |
| 4,984,536 | 1/1991 | Powell et al. . |
| 5,133,287 | 7/1992 | Hicks ......................... 119/3 |

FOREIGN PATENT DOCUMENTS

| | | | |
|---|---|---|---|
| 0147991 | 5/1981 | German Democratic Rep. ........................ 119/51.04 |
| 2221059 | 1/1990 | United Kingdom ............ 119/51.04 |
| 1281007 | 7/1992 | United Kingdom ............ 119/51.04 |

Primary Examiner—Gene Mancene
Assistant Examiner—Todd E. Manahan
Attorney, Agent, or Firm—Larson & Taylor

[57] ABSTRACT

An automatic fish feeding system with a first feeder mounted on a first tank holding water and a school of fish and a second feeder mounted on a second tank holding water and a school of fish. Each of the feeders has a container for holding a supply of food and an electric motor for driving a food discharge conveyor for feeding food from the container into a tank. A control system for the feeders includes a power supply, a control center and a power lead connected to a station at each feeder. The control center, for a preselected time period, continuously distributes a first voltage to the station for each feeder and intermittently distributes a second voltage to the station for each feeder. The system has a power connection from the electric motor of the first feeder to the adjacent station, a power connection from the electric motor of the second and other feeders to adjacent stations. Each station has a switch for independently connecting the power connection to one of the first voltage and the second voltage.

21 Claims, 9 Drawing Sheets

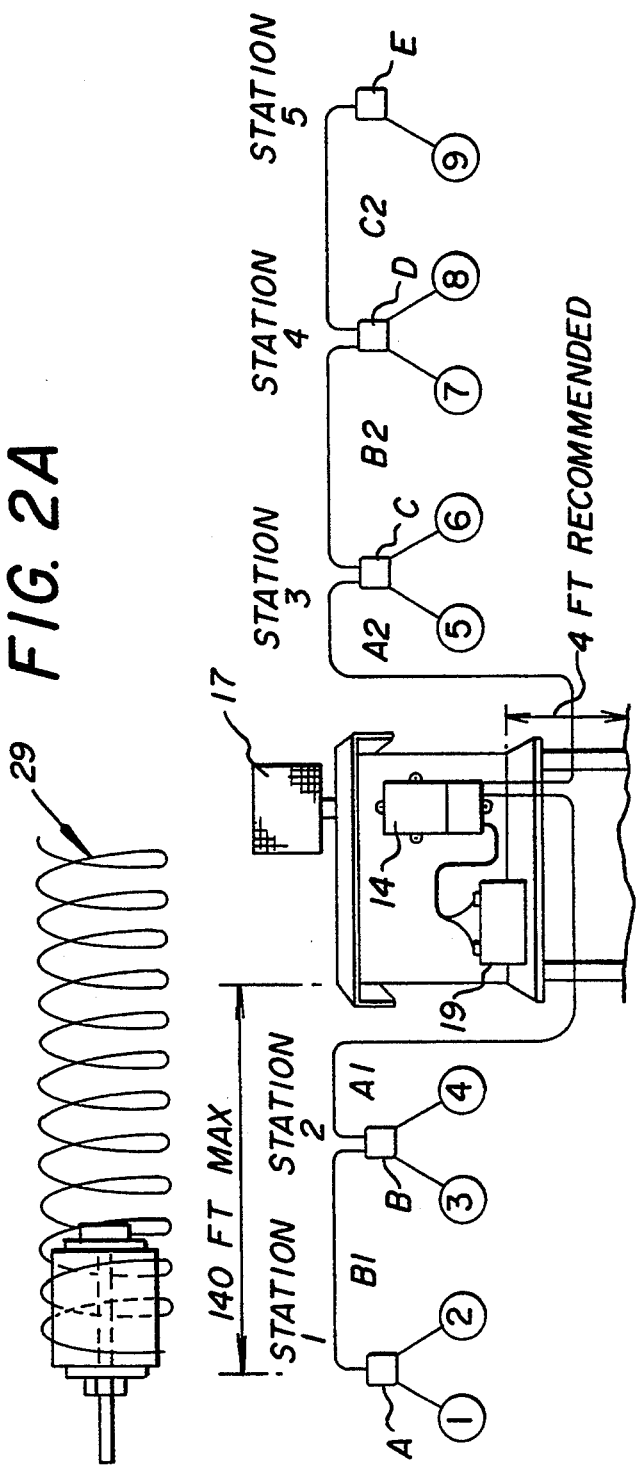
FIG. 2A
FIG. 3
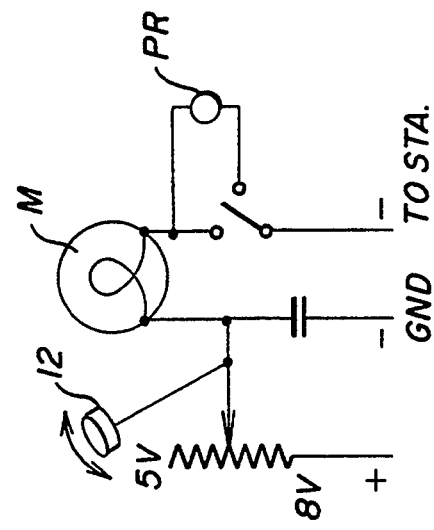
FIG. 7

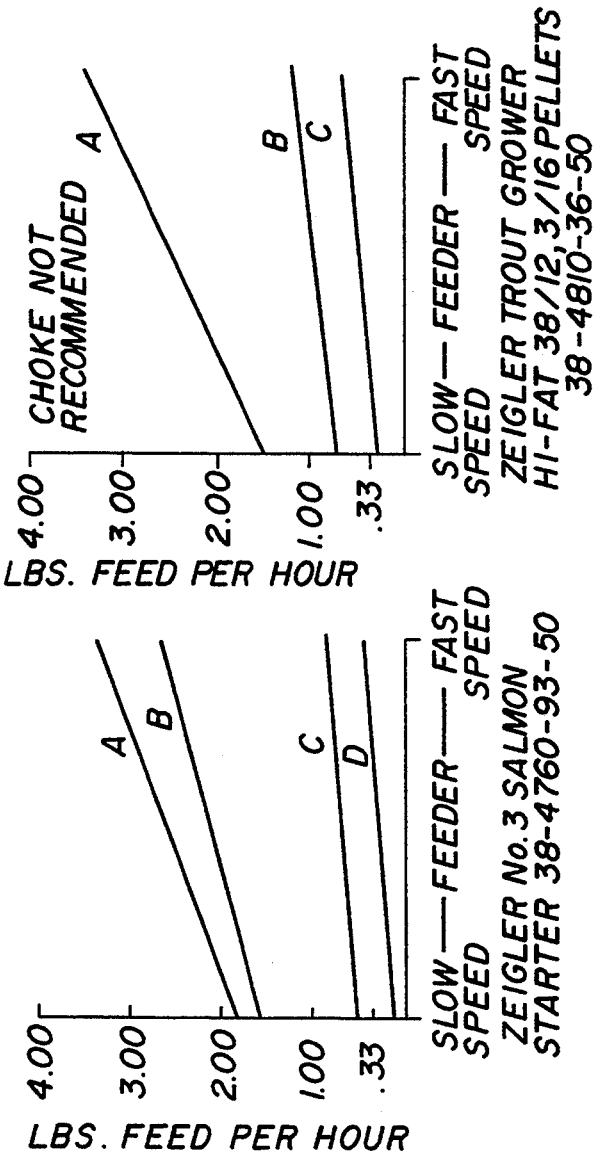

FISH FEEDING SYSTEM

BACKGROUND OF THE INVENTION

A. Field of the Invention

The present invention relates to fish feeding systems and, in particular, to a system which provides automatic control of the feed rates to fish.

B. Discussion of the Prior Art

U.S. Pat. No. 4,359,014 to Molaug, et al. describes a food dispensing system which intermittently dispenses food to fish based upon the oxygen content of water in a tank within a plurality of tanks.

U.S. Pat. No. 4,027,627 to Fillion describes a feeder comprising a hopper with an impeller to direct a broadcast feed from the hopper with an associated timing mechanism utilized to provide interval feeding from the feeder in to a fish pond.

U.S. Pat. No. 3,368,529 to Ferris describes a feeding system for cows which has individually adjustable rate of feed positions.

U.S. Pat. No. 3,113,556 to Jarvis describes an automatic fish feeder having an auger which is controlled by a motor and timer. The feeder has the capability of continuously feeding fish in a tank for 24 hours per day over a period of a number of months.

Intensive aquaculture systems operate with two fish husbandry fields of thought. The first is for small fish. This husbandry practice occupies about ¼ of the farm but takes the most management time. A series of tanks of water are provided. The tanks contain respective groups of fish of different sizes. The water exchanges about 3 times per hour i.e. (new water in and old water out). Thus, for example a fish tank of water would contain the fishlings of a very young age, while successive tanks each contain a group of fish of bigger and bigger size until a last tank contains fish big enough to compete with market size, viz., the adult fish.

Each small fish group is fed a different size food by the feeder and the feeding rate is increased by speeding up the motor as the fish grow. Fish can stay in a tank group until the biomass capacity of the tank is reached for the group. The biomass capacity is a number of fish pounds or number of fish determined by the critical gas levels in the water (such as oxygen), the water quality (which is lowered by fish body excretions and excess feed), and the fish size (metabolism rate). When the tank biomass capacity is reached, the fish population must be divided into another tank and typically a larger size feed can be fed by a different spring to the now larger fish. The fish are always fed the largest sized feed possible to minimize impact on the water quality.

When the fish reach a size that they can eat the largest sized food pellet (about 7 inches with trout) a different husbandry is practiced. The small fish are mixed with the larger fish until the biomass capacity of the tank is approached. Then with frequent harvesting of the big fish for markets and with the younger fish growing larger it is possible to achieve the tank biomass limits constantly. The benefits of this are maximum production per capital investment in the farm.

Another benefit of continuous feeding is the balance established in the tank which bears on fish stress, feed utilization, fish excretions into the water and the use of gases (such as oxygen) in the water. This balance provides management benefits to the farm since all mature tanks are treated alike and system capacity is a maximum.

If larger fish were managed in size groups as younger fish are managed there would be constant management problems of how and where to feed and inefficient system utilization. If batch or interval feeding of fish is done in a system with a biomass near capacity, large stress variations occur on the fish due to fluctuations in the oxygen gas levels in the water. Thus, economies of capital and operation endorse continuous feeding of fish.

The above prior art fails to teach such a fish feeding system which operates to continuously feed the fish during the daylight hours and to maintain a balance of the amount of oxygen available for the fish.

SUMMARY OF THE INVENTION

According to one aspect of the present invention, I provide an automatic fish feeding system having a feeding means for feeding a first school of fish; the feeding means including means for mounting the feeding means adjacent a tank, means for holding a supply of food, and means for discharging food from the holding means into said tank; means for controlling the feeding means including means for continuously supplying a first voltage to the feeding means, and means for intermittently supplying a second voltage to the feeding means; means for the feeding means for selecting between said first voltage and said second voltage; and means for the feeding means for independently connecting the discharging means to the selecting means.

According to another aspect of the present invention, I provide an automatic fish feeding system having a first feeder adapted to be mounted on a first tank for holding water and a first school of fish. A second feeder adapted to be mounted on a second tank for holding water and a second school of fish is also provided. Each of the feeders has a mount for supporting the feeder adjacent a tank, a container for holding a supply of fish food, a D.C. electric motor for driving a fish food discharge conveyor for feeding fish food from the container into a tank to feed the school of fish therein. Also provided is a control system for the feeders including a supply of power, a control center and a power lead connected to a station adjacent to each feeder. The control center is further characterized in that, for a preselected time period, it may continuously distribute a first voltage to the station for each feeder and it may intermittently distribute a second voltage to the station for each feeder. A power connection is provided from the D.C. electric motor of the first feeder to the station adjacent the first feeder. Also, a power connection is provided from the D.C. electric motor of the second feeder to the station adjacent the second feeder. Each station has a switch for connecting the power connection either to the first voltage or to the second voltage, whereby the first and second feeders can be controlled to feed continuously during the preselected time period or to feed intermittently during the time period or for one feeder to feed continuously while the other feeder feeds intermittently during the preselected time period.

According to a further aspect of the present invention, I provide the control center with a photocell which turns off the continuous and/or intermittent voltages at dusk and turns on the voltages at dawn.

According to still another aspect of the present invention, the supply of power includes a solar panel and a D.C. battery. These and other objects will be readily evident to those skilled in the art upon study of the following specification and the accompanying drawings.

DESCRIPTION OF THE DRAWINGS

FIG. 2A shows an exemplary spring used in the feeders according to one embodiment of the present invention.

FIG. 3 is a diagram schematically showing a control system and nine feeder stations according to one embodiment of the present invention.

FIGS. 4A, 4B, 4C are charts for the selection of springs used in the feeders according to one embodiment of the present invention.

FIG. 6 is a key to the reconstruction of a schematic diagram of the sub-circuits shown in FIGS. 6A-6D.

FIG. 7 is a schematic diagram of the circuit for the motor in a feeder according to one embodiment of the present invention.

DESCRIPTION OF THE PREFERRED EMBODIMENT

Figure 1:
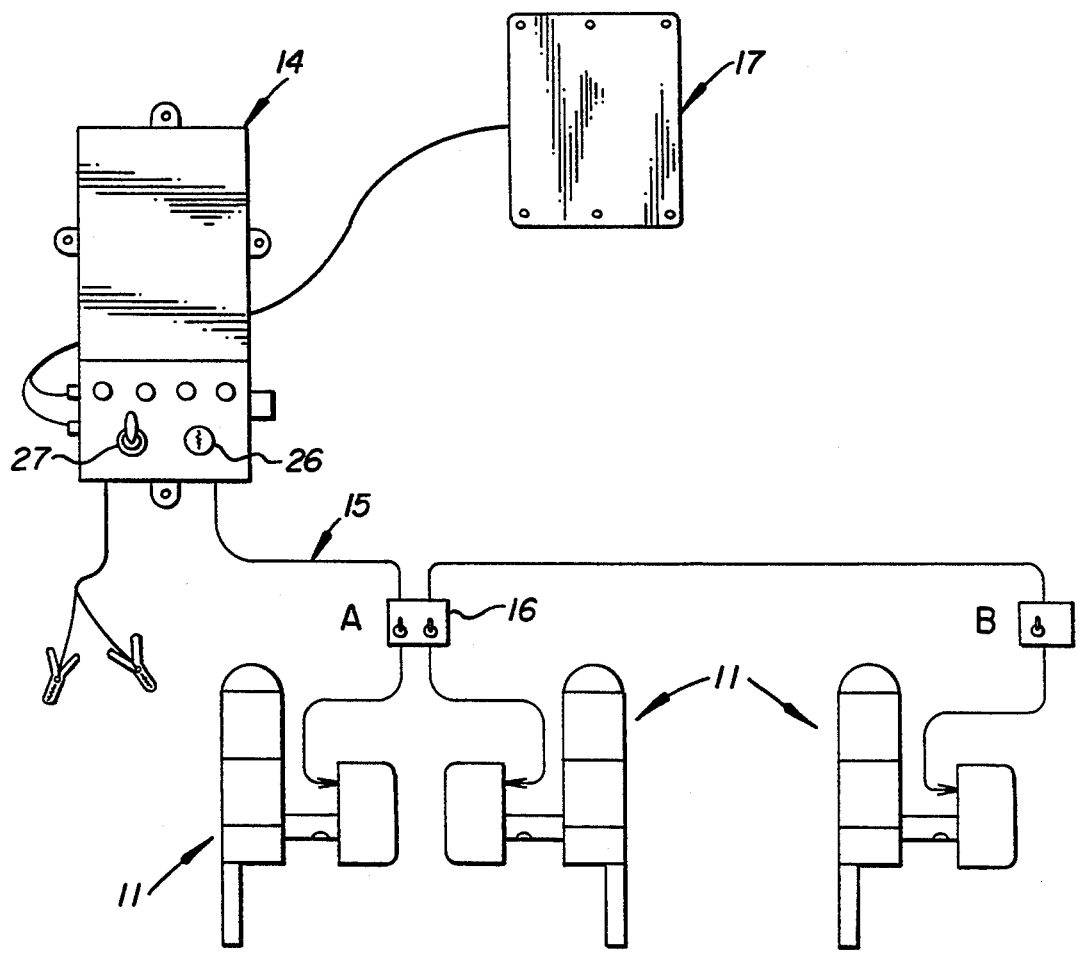
FIG. 1 is a schematic diagram showing the interconnection of a control system with exemplary feeders according to one embodiment of the present invention.

The basic feeder 11 (FIGS. 1, 2) and a 6 volt lantern style battery is a complete unit ready to deliver feed. The feeder works on the fish management principle of continuous feeding. It operates continually during daylight hours at variable speeds determined by setting a knob 12. The feeding rate varies between approximately 0.15 pounds per hour to 3.5 pounds per hour. The amount of feed delivered to opening 13 will vary according to the knob setting, spring size, choke, and feed size. The differences in feeding rates offer the operator maximum flexibility according to individual feeding requirements.

Maximum control can be obtained by connecting the basic feeder 11 to a control center 14 (with as many as 30 feeders controlled by either an 110 AC or 12 VDC control center), that will provide both intermittent and continuous feeding options for individual feeders. Feed timing and duration is provided by digital electronics in the master control center 14. The control system is complete with a control center 14, power lead 15 (length(s) as required) and station boxes 16 for attachment to the feeder(s) 11. The feeders 11 are very dependable due to the simplified design and ease in operating. The feeders 11 are also easily repaired on site.

The feeders 11 shown in FIG. 1 may be operated continuously or intermittently during daylight or night (with a timer) to deliver a specified amount of feed per day to a school of fish. The feeder control center 14 is designed to control operation of the feeder 11 when the control center has power available (i.e. when it is plugged into 110 AC or hooked to a 12 volt battery). The control center 14 distributes on power leads to stations during daylight hours a low DC supply voltage and two ground methods to start the feeder motors. The feeder motors are hooked up through the stations to a selected ground wire which is grounded through the control center 14 either by daylight control or the daylight control and the intermittent timer. When the central control grounds the feeder motor to the power supply, the motor will start. The intermittent DC voltage is adjustable "on" and "off" as a percentage of a 20 minute cycle at the control center. This allows a degree of correlation with the water exchange rate in the tanks and steadies water quality variation. The control center allows adjustment of the feeding cycle from 25%, which is 5 minutes "on" and 15 minutes "off", followed by repeated a cycle of 5 mins. "on" to 15 mins. "off", etc ... to a cycle of 100% "on" which is 20 minutes "on" and no minutes "off". The continuous DC voltage is available all the time. Both continuous and intermittent voltages are automatically turned off at dusk and on at dawn by the control center 14.

Stations A, B, etc., located along the power lead 15 are where individual feeders 11 are connected to the control center. The stations A, B, etc., also allow individual feeders to select operation on the variable intermittent voltage or continuous voltage.

Lightening is of no greater concern to the control center 14 or the feeder 11 than it would be to any other electrical appliance. All inputs to the control center are electrically protected within limits of power variations. When connecting a solar panel module 17 to the control center 14 with a battery attached at 18 (not shown) caution is advised. Power will exist both across the terminals of the control center and across the leads of the solar panel module 17 if it is functioning. It is recommended that the user cover the solar panel module 17, then connect the solar panel module 17 to the control center 14, followed by connecting the battery to the control center 14. Keep the battery leads safely isolated and connect a battery to the control center 14 within 5 minutes. Without a battery and with the solar panel module 17 operating, internal components of the control center 14 may be oscillating. Disconnecting or covering the solar panel module 17 will stop this. The system user should always follow battery manufacturer's recommendations with regard to the handling and recharge of batteries.

The following are some specific parameters of the various units according to one embodiment of the invention:

A. CONTROL CENTER 14

AC Model 110 volts AC, 60 Hz must be >95 volts AC; DC Model 12 volt battery must be >10 volts charge; The control center 14 takes electrical power in and efficiently delivers a reduced DC voltage (constant and dependable) to the feeders 11 as selected at the control center.

B. FEEDER 11

A 6 volt lantern style battery will run any feeder independently of the control system. The feeder performance will vary with the voltage of it's battery and all performance will stop with battery rundown.

C. PERFORMANCE SPECIFICATIONS

The control center 14 is enclosed in a rated NEMA 4X (outdoor, weatherproof) enclosure. The system may be operated and hooked up without entering this enclosure.

The control center 14 is tested and satisfactorily operates at least 30 feeders on a power lead less than 140 feet long between −10 degrees and 110 degrees fahrenheit.

The control center 14 when operating draws power from a 12 VDC industrial style battery without recharging (with or without the solar panel module as noted) as follows:

| Temp deg F. | # Feeders | Amps | Expected Battery Performance Period |
|---|---|---|---|
| >40 deg | 30 @12 VDC bat only | <.6 | 7 days |
| | 15 @12 VDC bat only | <.3 | 14 days |
| | 15 @12 VDC & Solar Mod | <.3 | CONTINUOUS |
| −10 deg | 30 @12 VDC bat only | <1.2 | <2 days |
| | 15 @12 VDC bat only | <.6 | 3 days |
| | 15 @12 VDC & Solar Mod | <.3 | 7 days |

The feeders 11 draw more power at lower temperature because the motor lubricants stiffen and require more power for operation. This occurs in increasing amounts below 30 degrees fahrenheit. It is not a serious power consumption problem until the lower temperatures.

The control center 14 will automatically shut down to protect itself whenever the supply voltage is less than 10 VDC. It will also safely close down when the power drain on the feeder power lead 15 is too large or if a short occurs in an individual feeder. It has been found that the feeders 11 of this embodiment do not reliably start at the slow speed setting and at −10 degrees fahrenheit.

The AC model meets all of the above performance parameters.

The control center 14 is fused to protect it from excessive input power. The DC model is equipped with a buzzer to alert the user of an incorrect battery connection.

C. INSTALLATION

The feeder control center 14 may be mounted outside on a post or board, See FIG. 3. A degree of weather protection such as a canopy roof to provide protection from the sun and the rain will lengthen the life of the control center. Do not enclose the control center inside a darkened box. The control center must be able to "see" day and night to operate. The power lead and stations may be located outside. However, the stations should not be on the ground or exposed to excessive weather.

A recommended installation of a battery 19 to power a feeder system with a solar panel module 17 for nine fish rearing areas, each with one feeder is shown in FIG. 3. In FIG. 3, Cable 1 consists of power leads A1, B1, and stations A and B which are manufactured (less than 140 ft long) with the user providing dimensions A1 and B1 (within plus or minus two feet). In FIG. 3, Cable 2 consists of power leads A2, B2, C2, and stations C, D, and E which are manufactured (less than 140 ft long) with the user providing dimensions A2, B2, and C2 (within plus or minus two feet).

The system will not work if the cables are damaged. Therefore, protect the cables and do not locate them in foot or vehicle traffic areas without protection. The user must give consideration whether the cables are buried, suspended in air, or otherwise safely connected from station point to station point. A station point such as A can service two feeders (1 and 2) or two tanks separated a maximum of seven feet apart.

D. WIRING AND CONNECTIONS

The connections of the power lead 15 to the control center 14 must be correct to operate. The system is polarized and polarity must be observed to avoid damage to motor parts. The control center 14 has three terminals located on its bottom. They are labeled +positive, −negative continuous, −negative intermittent. The four wires in the power cable are connected as follows: The black wire to the plus positive terminal; the white wire to the negative continuous terminal; the red wire to the negative intermittent terminal; and the bare wire to the minus test terminal for a ground voltage.

Only this set of connections will allow correct operation of the system.

It's required that the power leads 15 be strain relieved to the control center bottom mounting pad or near the box for connection protection. The positive and ground potentials are passed directly to each feeder thru the stations. They act to charge a capacitator in each feeder for starting the motor in cold weather. The motor is started by the control center (or switch and photo cell on the feeder if switched into the circuit) connecting the negative continuous or negative intermittent terminals to ground. The selection of which terminal is used by the control center for a feeder is determined by the switch on the station.

The terminal for the minus test, which is the system ground is also used for testing purposes. If the system is not operating as expected the operator should use the negative test terminal on the right side of the box below the fuse. The operator should connect or touch a jumper wire from (minus test) to both (minus continuous) and (minus intermittent). After the connections are completed, the operator can observe the feeders' operation; if operation resumes, the PC board is faulty.

E. OPTIONS AND MODIFICATIONS

The control center 14 is designed to operate with a solar panel module 17 as shown in FIGS. 1 and 3 to recharge the 12 volt battery 19. This solar panel module 17 with a battery will supply enough power to run 15 feeders continuously without servicing the battery. The solar panel module 17 acts to extend the performance period between recharges of a battery with more than 15 feeders.

The control center 14 is designed to accept a daughter board internally on its current PC board for monitoring additional fish feeding parameters. This feature allows for expansion, adaptation and is also useful for research and experimentation.

The control center 14 has a day-night photo cell bypass switch position to allow operation of the system indoors at the on-off discretion of the operator. This switch is a third position on the bypass switch which normally bypasses all controls to the feeder.

The feeder 11 as shown in FIG. 1 may be provided with a stirrer designed to stir the #2 meal and similar feeds and reduce the bridging which may occur with oily feeds.

Figure 2:
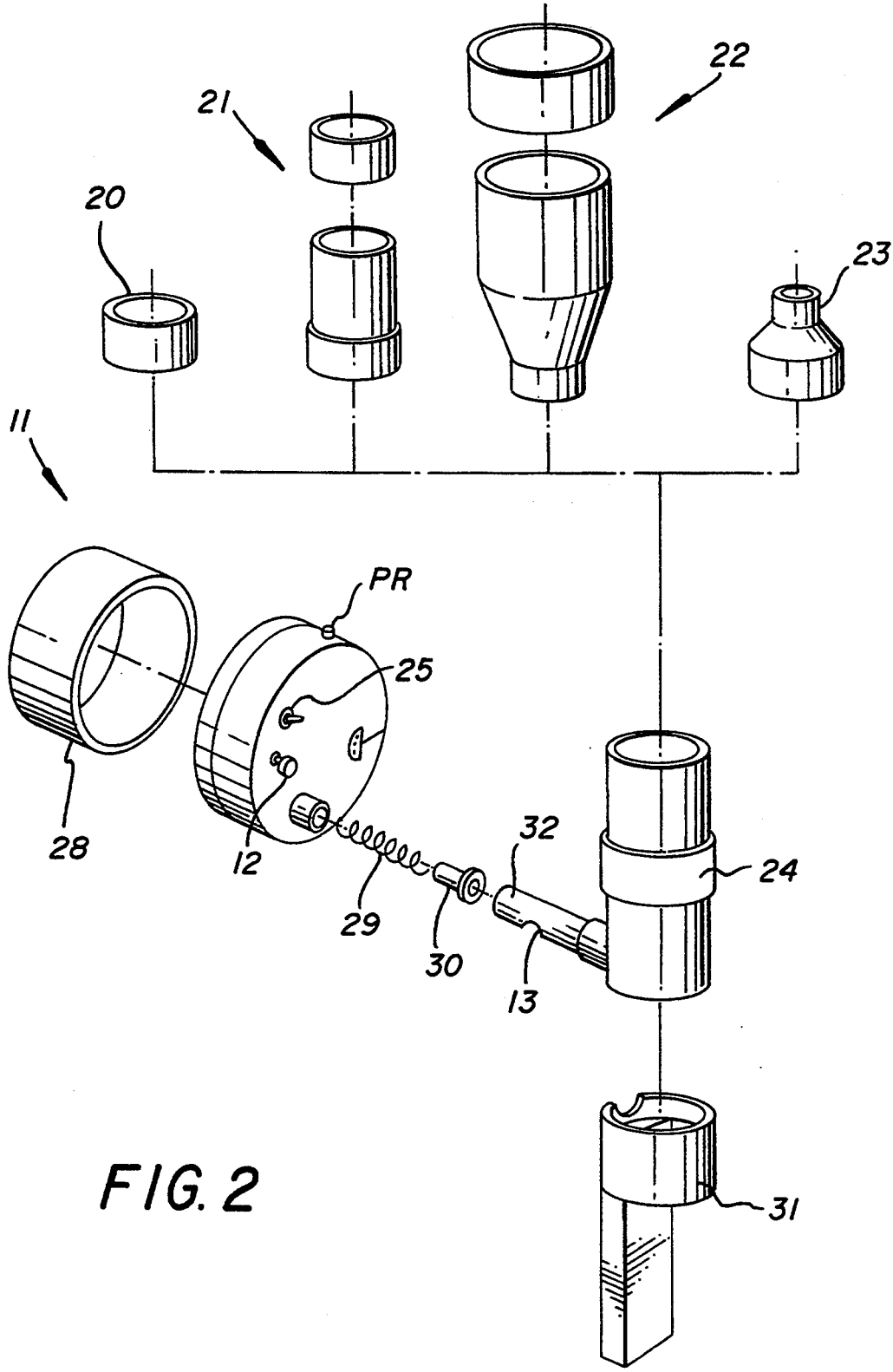
FIG. 2 is a schematic exploded view of a feeder according to one embodiment of the present invention.

The feeder 11 as shown in FIG. 2 has a basic 2.5 lb hopper 20 and may use several hopper options to increase the storage capacity of the feeder. They are: 5 lb. hopper 21, 10 lb. hopper 22, or Adapter 23, Babington Hopper.

All hoppers fit directly over the top of the feed box 24 of the Feeder.

F. GENERAL OPERATION

The control system consists of the control center 14, a power lead 15 to feeder stations, and the station boxes 16 with hookup cords for the feeders 11. In one embodiment, control center 14 is designed for use with standard 110 VAC 60 Hz power. Another embodiment is designed to use with a 12 volt battery suitable in size for operating an automobile. The control center 14 should be installed outside as near as possible to the feeders, but should be protected from the elements. The life of the control center 14 is extended by providing anti-corrosion design provisions and using good management in operation.

The control center 14 is automatically turned on at dawn and off a dusk by a photocell. This photocell is wired with delays on to avoid operation because of the lightening or passing car lights at night. The photocell operates correctly even with as much as a 10 second delay.

The control center 14 does not have a true "off" switch. Disconnect the power, remove the fuse, or turn off individual feeders to turn the feeders off for a period of time.

The control center 14 provides steady power levels to the feeders 11. This insures predictable performance and reliable feeding of a school of fish. The control center provides two methods of operating the feeder: a continuous run and an intermittent run option. The user may select the feeding method for each feeder at the station hookup for the feeder. Move the toggle switch 25 associated with your feeder "up" for intermittent feeding, or "down" for continuous feeding. The intermittent run option is adjusted manually at the control center. Knob 26 may be adjusted to the percentage of time that the user wishes the feeder to operate. Feeders will be intermittently operated in a 20 minute cycle from 25% to 100% of the time according to the setting made. The knob 26 will turn past 100% a small amount. The position past 100% is an "on" all the time position. The control center automatically shuts down all feeders at dusk based on light level regardless of the knob 26 settings on the intermittent control. Hence, the fish will be fed only during daylight during December or June regardless of the intermittent settings.

The control center 14 indicates by a red pilot light when a continuous or intermittent voltage is supplied to the feeders. A bypass switch 27 (toggle up) is located on the box to bypass all controls on the control center. A flashing yellow pilot light indicates that the controls are bypassed. This bypass allows the user to monitor the performance of the feeders at night and/or independent of the intermittent controls. The normal operation of the toggle switch 27 (toggle middle) is with the control center operating as a complete monitor. A third position on the bypass switch 27 (toggle down) allows the control center to operate without being turned off and on at dusk and dawn. The unit is run continuously with the two methods of feeding: continuous and intermittent. This option is designed for feeding fish inside a building with special lighting controls.

On the AC embodiment of the present invention, a 1 amp 3 AG fuse is provided to monitor the AC power input to the control center. On the DC embodiment a 3 amp 3 AG fuse is provided to monitor the DC power use. In addition, the DC embodiment is equipped with a buzzer to alert the user to an incorrect hookup. On both embodiments the output power is monitored internally to safe levels. In both instances the control center will shut down if excessive power use is demanded until the demand is lowered (problem fixed).

When the battery 19 has run out of energy, its voltage will drop and the control center automatically disconnects from the battery until a recharged battery is connected to the control center. A "Battery OK" pilot light on the control center indicates that the battery charge is adequate. Typically, a charged car battery should operate a control center with 15 feeders operating in excess of 14 days.

G. OPTIONS

A solar panel module 17 may be used to supplement the power needed by the control center to run the feeders. It will act to extend the battery recharge time. It is not intended to provide the only power for the system. A battery must be connected as well. Given "normal" weather, a solar panel module will power 15 feeders indefinitely.

If operating a solar panel module 17, the user should cover or disconnect the module 17 when servicing the battery. The user should not leave the module attached to the control center for greater than 5 minutes without a battery attached. This is important to protect internal components that may be oscillating inside the control center.

The feeder 11 shown in FIG. 2 is designed to solve many fish feeding problems with a long life of service. The feeder 11 is built with many standard PVC, schedule 40 parts to allow owner repairs and/or customizing. The feeder will operate independently with its own battery (6 volt lantern type) or with a control center. The control center offers more control options for the feeder and will run up to 30 feeders. FIG. 7 is a schematic of the motor circuit in the feeder. The feeder 11 is operated from the drive box 28 by a toggle switch 25 either down in the "continuous on" or the up "solar active" position. In the "solar active" position, the feeder 11 is turned "off" and "on" automatically by darkness or light respectively sensed by photo resistor PR in FIG. 7. The toggle switch 25 "off" position turns the feeder 11 off for both the control center or the 6 volt battery option. Also located on the drive box 28 is a speed control rheostat SC operated by knob 12. The speed control SC will increase the feeding rate of the feeder up to about 40%. It is recommended that the feeder be run as slow as possible when the user starts feeding a school of fish. Then, the user can increase the feeding speed as the fish grow and can consume more feed.

Changing the springs 29 or choke 30 of the feeder is designed for ease and simplicity. Separate the feed box 24 by a gentle twist and pull. Based upon the size and number of fish to be fed, the user selects the spring size to be used from the chart shown in FIG. 4. (A supplied choke 30 may be installed in the feed box from the feed end of the tube to further cut the feeding rate of the small spring.) FIG. 2A illustrates one embodiment of a spring after selection. Next screw the selected spring 29 lightly into the spring drive (not shown). It is not necessary to tighten the connection of the spring to the coupling as it will tighten itself naturally by rotation. Carefully insert the drive box 28 and feed box 24 together. If the feed box 24 is full of feed, it may be necessary to twist or turn the boxes, to work the spring into the feed box. Another technique is to start the motor M in FIG. 7 and allow the spring to screw its way into the box.

When the boxes are together and in alignment, mount the feeder in its mounting block 31.

The three differently sized springs used with the feeder screw directly into a coupling located on the motor-gearbox output shaft. They are constructed using compression springs with rubber soft plugs in one end that fit snugly into the spring coils. The plugs, when compressed by a bolt thru their center, expand and firmly grasp the spring. The bolt is of a size to screw directly into the motor gear-box output shaft coupling. The rubber plug provides a secure grip on the spring and rotational flexibility for alignment variances. The three spring sizes are:

"Big" spring: 1,459" OD, 0.115 wire, at 1.4 coils/in. 8 to 9 inches long;

"Med." spring: 0.955" OD, 0.08 wire at 2.3 coils/in. , 8 to 9 inches long;

"Little" spring: 0.83 OD, 0.8 wire at 3.2 coils/in. 8 to 9 inches long.

Connected to the feeder the spring performance or feeding rate varies directly with RPM of the motor, and its coil outside diameter (OD) and inversely with its coils/inch. As the feeder motor turns, an internal feed volume of the coil (according to its number of coils/inch) is pulled out of the feed box 24 to the feed discharge point 13 for the fish.

The theoretical feeding rate is increased by an amount of feed pulled out of the feed box 24 by the spring on its outside as it turns. This additional feed can be restricted by adding a choke 30 in the feed box delivery tube 32 which is approximately the O.D. of the spring. The choke 30 restricts the flow of feed outside the spring diameter and allows lower feeding rates from the feeder. A choke 30 is not recommended except for the small or medium sized springs since it loads up the motor with more torque forces.

The feeder 11 mounting block shown 31 in FIG. 2 may be bolted or clamped as support for the feeder 11 directly to a tank, raceway, or structure. It is recommended that the feeder mounting block 31 sit on the edge of a tank or wall and be securely clamped or bolted to the wall using a C clamp or 5/16 diameter bolts. An additional vertical support may be required for large feed hoppers.

The feed box 24 of the feeder may be cleaned completely by unscrewing a plug in its bottom. When reinserting the clean-out plug, the user should tighten it securely and leave the nut perpendicular to the clear feed metering tube 32 on the feed box.

H. EXAMPLE

The feeder is designed to constantly feed fish. Intensive aquaculture designs of today encourage continuous feeding. It maximizes the feed utilization and minimizes the stress on the fish from oxygen depletion that occurs from batch feeding at intervals. Continuous fish feeding is obtainable with the feeder. For example, suppose that one wishes to feed a school of 8 inch rainbow trout that weight 1000 lbs in 58 degree water on March 21.

Then:

Install one Feeder;

Select the proper feed according to the size of the fish and manufacturer's recommendations;

Assume for a feed: Zeigler 3/16 pellets, Hi-fat 38/12 #38-4810-36-50

From *Fish Hatchery Management*, 1989, Table 25 select the feed conversion factor for rainbow trout in 58 degree water;

Conversion Factor=1.5%;

Therefore, feed to be fed per day is:

0.015×1000 lbs of fish=15 lbs of feed per day.

Since there are 12 hours of daylight per day on March 21 the rate of feeding is: 15 lbs per day/12 hours of daylight=1.25 lbs/hr.

Therefore:

Select from the charts of FIG. 4 a big spring at low speed on continuous feed cycle to feed these fish. Select a spring and feeding rate that allows the user to speed up the feeder as its school of fish grow and can consume more.

As a rule, feeder hoppers should be serviced once per day to observe fish feeding activity with a small handful of hand pitched feed at this regular time. Based on this daily experience with the fish, judgments can be made by the user to fine tune the feeder operation to meet the nutritional needs of the fish with continuous feeding.

I. THE SOLAR PANEL MODULE

The solar panel module produces electricity and is used for battery charging. The user should not use the solar panel module alone to the control center for greater than 5 minutes. The user should always use a 12 volt battery with the feeder control center or with the solar panel module.

Physically mount the solar panel module 17 before hooking up the wiring. To avoid the possibility of a shock, the user should cover the front of the panel with an opaque cloth before hooking up the module. The user should connect the red wire to the red terminal of the feeder control center, and connect the black wire to the black terminal.

The control center and solar panel module are protected from a mistaken backwards hookup of the solar panel module. No power will be provided to the battery from the module with a backwards attachment, and no alarms are provided for this error.

The solar panel module should be oriented toward the sun as much as possible. This is especially important during the middle part of the day, the module's most productive period. It is important to keep the solar panel module free from shadowing all day and during all seasons.

As a general rule solar panel modules 17 used in the northern hemisphere should be faced due south (not magnetic south). Modules used in the southern hemisphere should face due north (not magnetic north).

The following table shows the angle (from horizontal) at which the solar panel module should be installed in order to maximize annual energy output. At most latitudes, performance can be improved by a somewhat flatter angle during the summer and a somewhat steeper angle during the winter.

| LATITUDE | INSTALLATION ANGLE |
| --- | --- |
| 0–4 degrees | 10 degrees from horizontal |
| 5–20 degrees | Add 5 degrees to local latitude |
| 21–45 degrees | Add 10 degrees to local latitude |
| 46–65 degrees | Add 15 degrees to local latitude |
| 65–75 degrees | 80 degrees from horizontal |

Example: A solar panel module mounted in Miami, Fla. (latitude 26 degrees) should be tilted at approximately 36 degrees from the horizontal and should be faced due south.

If solar panel modules are not subject to regular cleaning, it is recommended that they not be mounted at less than a 15 degree tilt angle. Flatter angles cannot take full advantage of the cleaning effect of rainfall.

The control center has a built-in blocking diode which prevents battery discharge during periods of darkness and a battery charge regulator which prevents storage batteries from being over-charged and possibly damaged or destroyed.

J. DETAILED DESCRIPTION OF CONTROL SYSTEM

Figure 5:
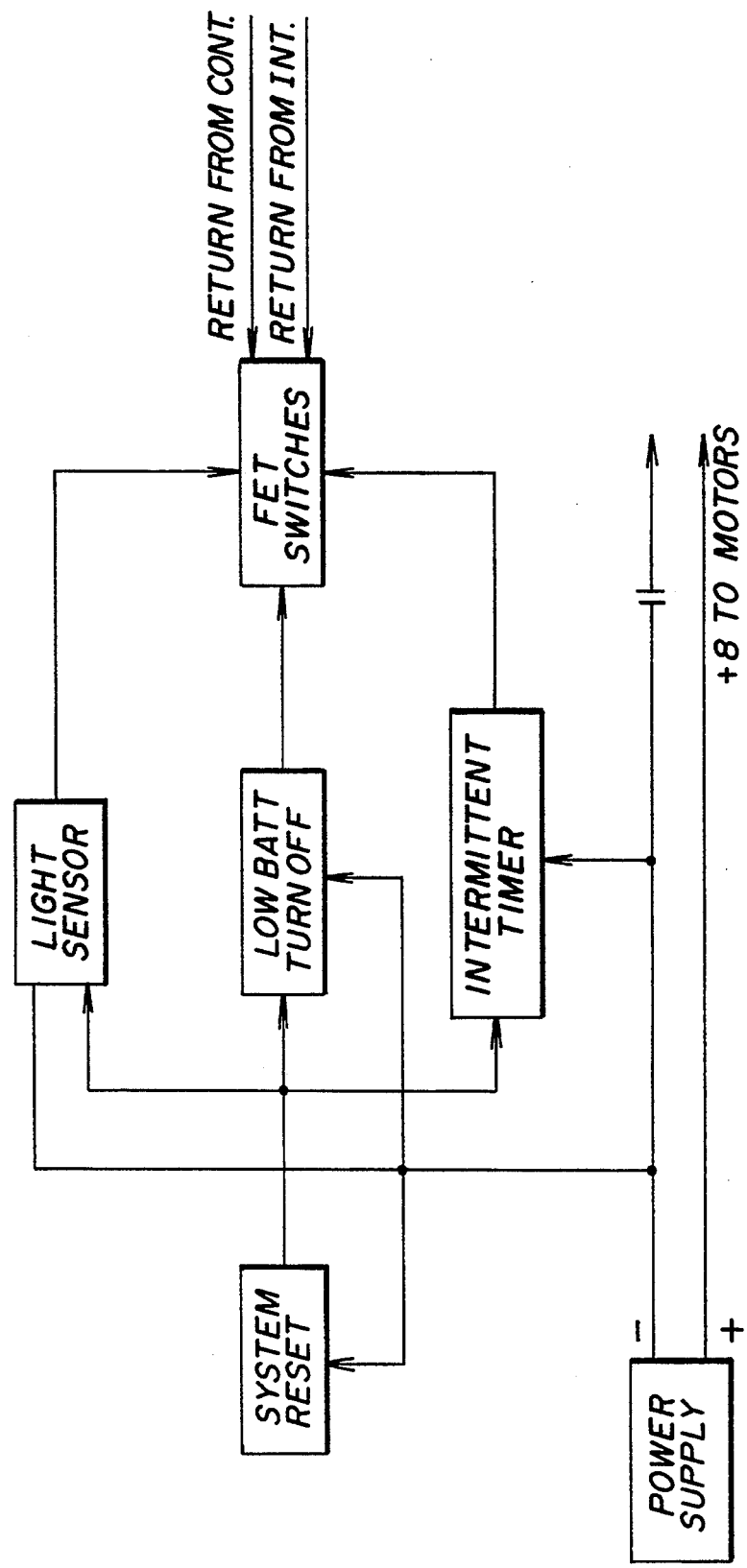
FIG. 5 is a block diagram of the feeder control system according to one embodiment of the present invention.
Figure 6A:
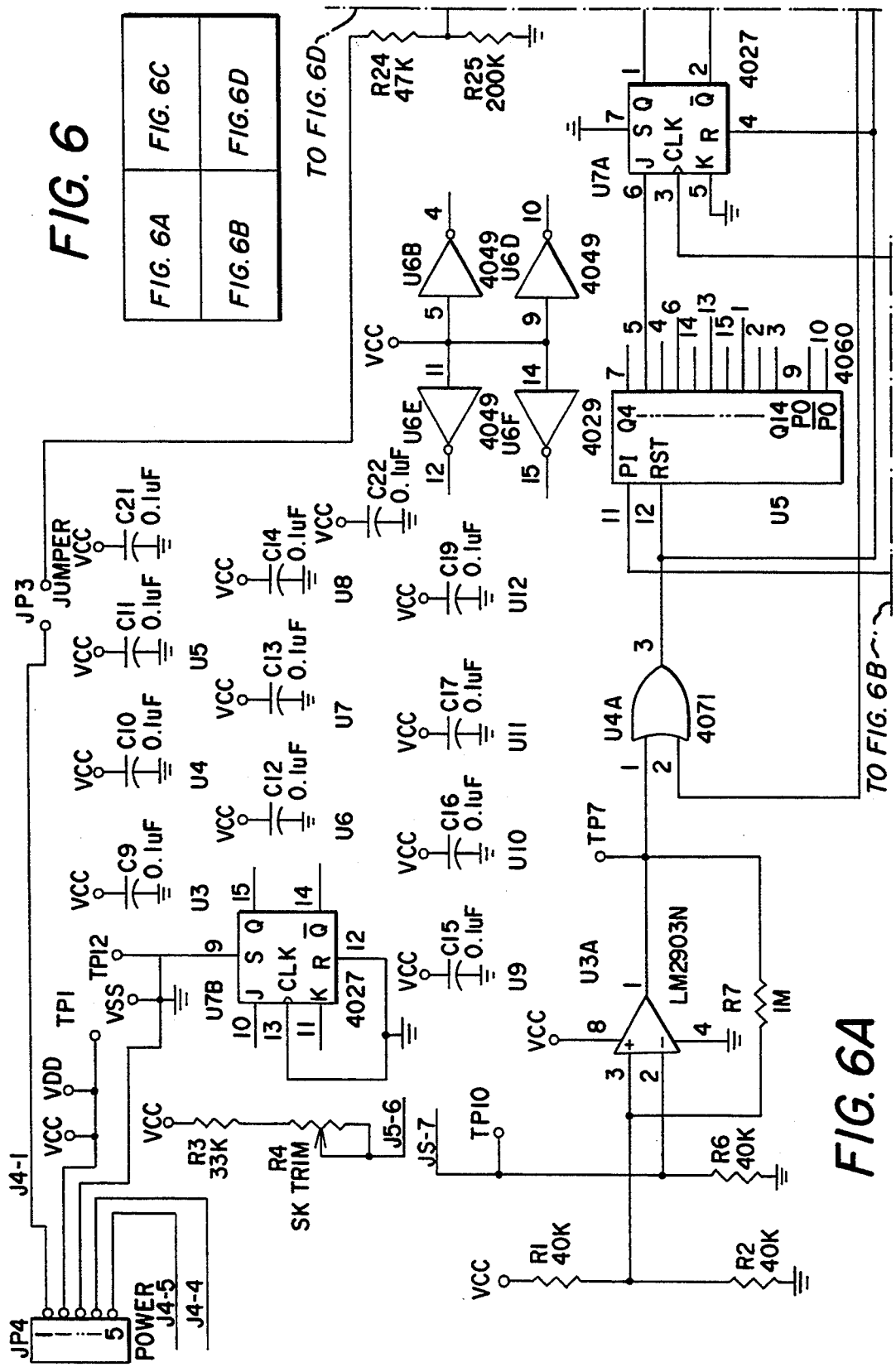
FIGS. 6A-6D are portions of a schematic diagram of the sub-circuits of FIG. 5.
Figure 6B:
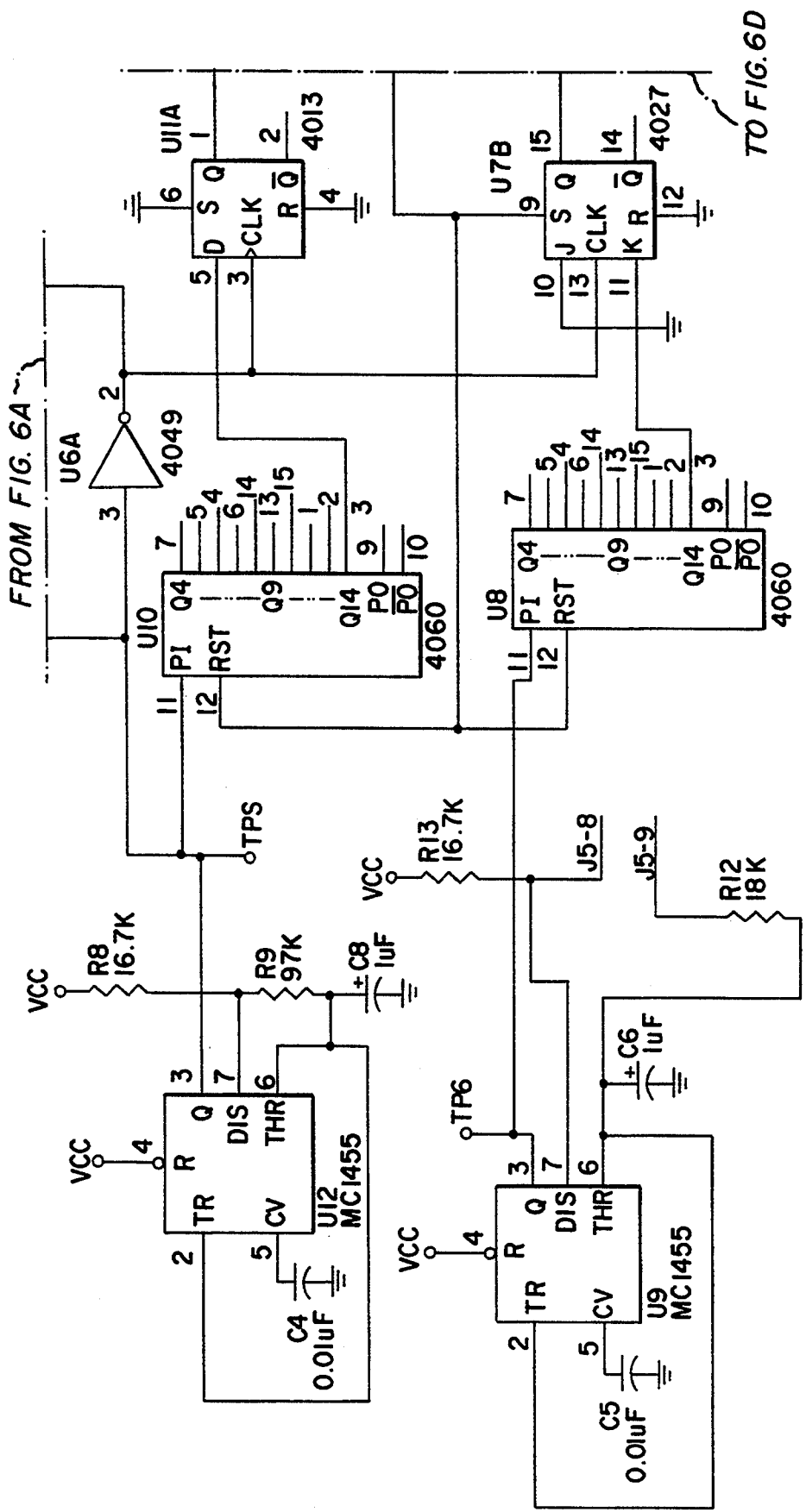
Figure 6C:
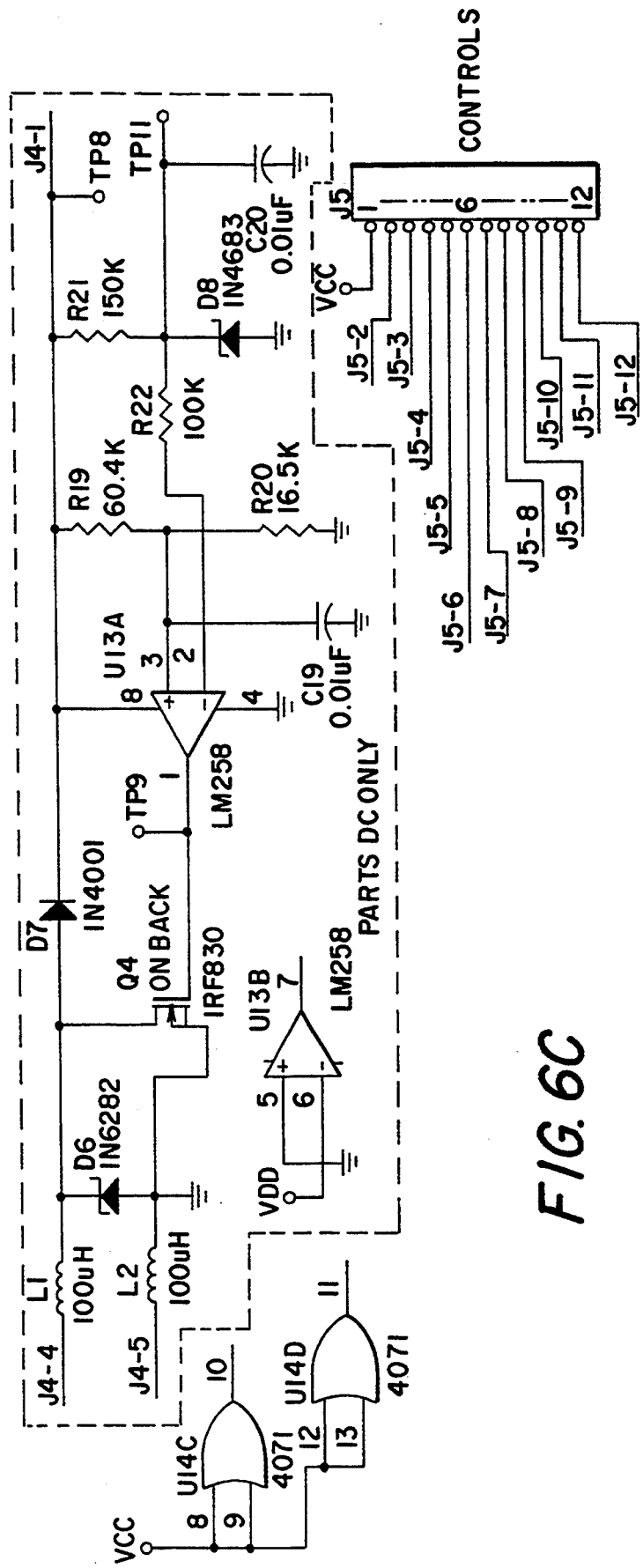
Figure 6D:
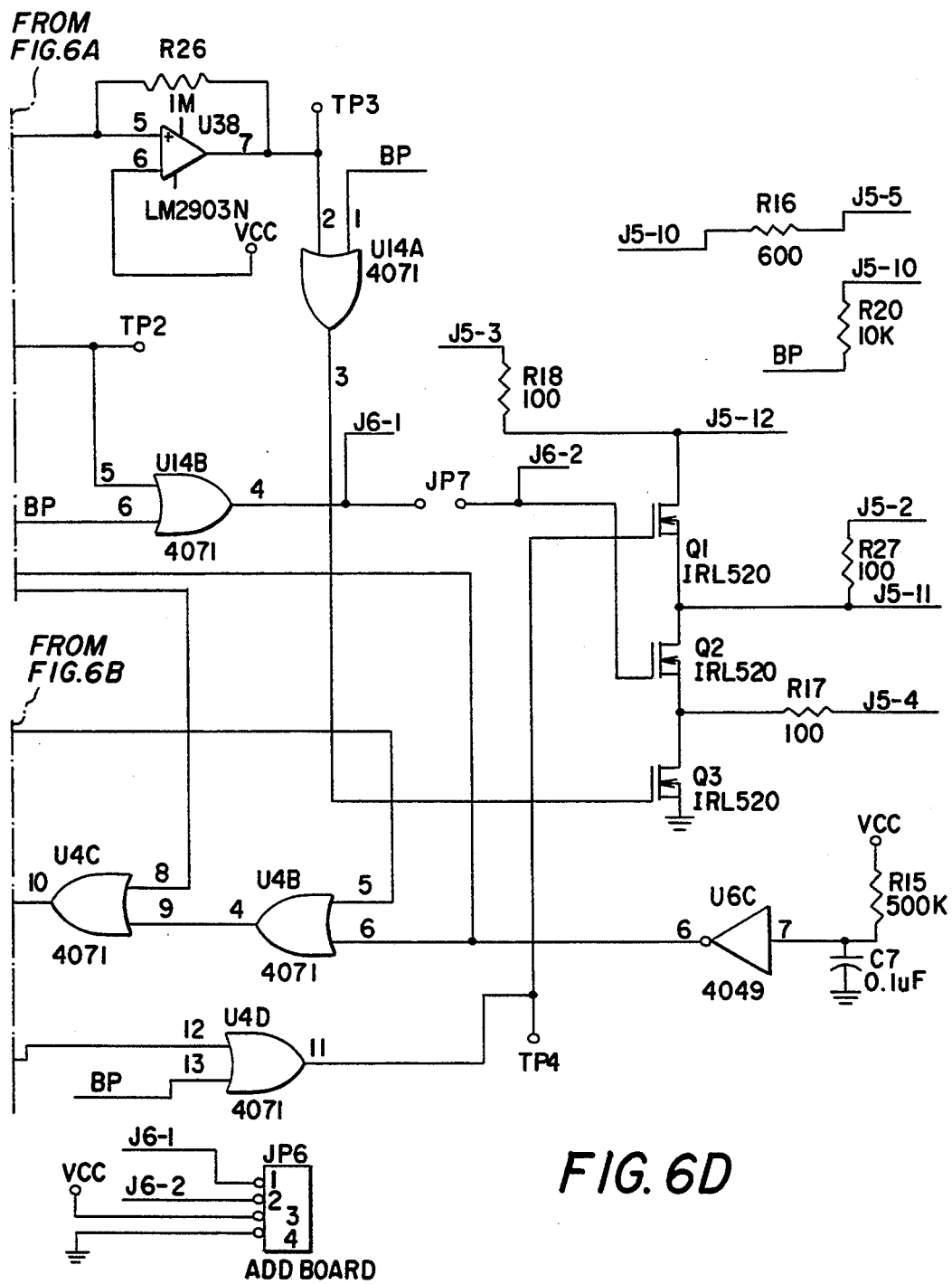

FIG. 5 is a block diagram for the feeder control system. The function of each block is:

Power Supply—Input is either 12 VDC or 120 VAC and output of two regulated 8 volt supplies. One supply is used for the motors and the other is used for the circuitry. In the DC embodiment, there is also a +12 output from the power supply which is used in the LOW BATTERY TURN OFF switch.

Light Sensor—The function of this section is to cut the system off at dusk and on at dawn based on the light level. This function may be bypassed by the bypass signal (BP) or by shorting out R5 with SW1 in the light bypass position.

Low Battery Turn Off—This circuitry is only used in the DC embodiment and cuts the unit off when the battery voltage drops below 10 V. This function may be bypassed by the bypass signal (BP).

Intermittent Timer—This section provides the intermittent ground for the variable duration intermittent motor drive. This function may be bypassed by the bypass signal (BP).

Solar Charging Regulator—This is found only on the DC embodiment with the solar option. The solar charging regulator maintains a voltage of 14 VDC applied to the battery from the solar cell, when there is enough light to do so.

System Reset—This circuitry produces a short pulse when the unit is first turned on to place the electronics in the proper state for start up.

With reference to schematic diagram FIG. 6, the following describes in detail the operation of the sub-circuits which are shown in FIG. 5 as described above.

1. Light Sensor

The circuit is a comparator (U3A) in a Schmitt trigger configuration using a photo resistor (R5) to control the switch inverting input. As more light falls on the photo resistor, the resistance goes down and the voltage at the inverting input of the comparator increases. The sensitivity of the photo resistor is adjustable through R4. The output from the comparator is active LOW and enables a counter (U5), which is used to produce a 5 sec delay ON. The clock signal for the counter comes from U12, the clock IC for the fixed timer (see intermittent timer). The counter enables a latch (U7A). U7A remains HIGH until the light level diminishes enough to cause U3A to go LOW. The output of the latch is applied to the gate of Q2 through an OR gate (U14B). Q2 switches the high current return from both the intermittent and continuous motors. U4A enables the system RESET signal to clear the counter upon start up, and U14B allows the light sensor to be bypassed when the bypass switch (SW1) is on and the related control signal BP is HIGH.

2. Low Battery Turn OFF

This circuit consists of a comparator (U3B) used in a Schmitt trigger configuration, which compares a portion of the battery voltage with the regulated 8 V. The values of R24 and R25 are chosen so that the output of U3B goes low when the battery voltage falls below 10 V. The output of the comparator is fed into the gate of Q3, which switches the high current return from the continuous and intermittent motors, through U14A. U14A allows the low voltage turn off function to be bypassed when the Bypass switch is on and the control signal BP is HIGH.

3. Intermittent Timer

The intermittent time is based on percentage of a 20 minute cycle. The timer circuit consists of two timing circuits. The first is fixed and produces a pulse at 20 min intervals, and the other is adjustable through R11 and may be varied between 5 and 20+minutes. The clock signals are provided by two RC timing IC'S (U12- fixed U9- variable). The period of the output of U12 is fixed at 0.14 s, and the period of U9 may be varied from 0.14+s to 0.035 s. These clock signals are fed into 4060 counters (U10-fixed U8-variable), which output the desired time intervals. There is some over capacity in R11, which allows the period of U9 to be greater than 0.14 s and the overall interval of the variable timer to be greater than 20 mins. The period of the timing circuit will still be limited to 20 min because the variable timer is reset by the fixed timer.

The first cycle is started by either the system RESET. When the system is started up (U4B), or by the output of the light sensor, when the system is activated by light level (U4C). This HIGH pulse resets the counters and sets U7B which drives the gate of Q1 HIGH (motors ON). U7B remains in the HIGH state until U8-Q14 goes HIGH at the end of the desired ON time for the intermittent motors (determined by R11). When U8-Q14 goes HIGH, U7B goes LOW, and the gate of Q1 is driven LOW (motors OFF).

Once U7B goes LOW, it is unaffected by state changes of U8-Q14, and U7B remains LOW until the 20 min cycle ends. At the end of the 20 min cycle, U10-Q14 goes HIGH, and U10 and U8 are reset. The output latch U7B is SET and the gate of Q1 is driven HIGH (motors ON), and the cycle starts over again. This function may be bypassed by the bypass switch and the related control signal BP is HIGH (U4D).

4. Solar Charging Regulator

The circuit uses a comparator (U13A driving the gate of a FET (Q4) to regulate the voltage applied to the battery from the solar cell. L1, L2, and D6 form a protection network for the circuitry against lightning strikes, and they do not affect normal operation.

The circuit operates as follows. D1 stops current flow from battery to the solar panel when the solar panel is generating less than +14 VDC under load. Once the voltage produced by the solar cell is greater than +14 VDC, D1 begins to conduct. U13A uses a 3 V reference from D8 and a portion of the applied voltage to the battery to keep TP8 at +14 VDC.

When the solar cell produces more than 14 VDC, U13A applies voltage to the gate of Q4, which draws current away from the battery and loads down the solar cell, which draws the voltage across the cell down. The control signal to the gate of Q4 (TP9) will tend to chatter between HIGH and LOW. This is due to the drop in voltage of the solar cell when it is loaded by a conducting Q4.

once the voltage of the solar cell drops, U13A cuts off, thus cutting off Q4 and reducing the load on the solar cell. This allows the voltage from the solar panel to increase, which starts the cycle over again. This chattering is not a problem because the battery smooths out the voltage seen by the system. The signal at TP9 should be a square wave of varying duty cycle dependent upon the amount of power being produced by the solar cell.

5. System Reset

This circuit produces a HIGH pulse when the unit is first turn ON, which is used to reset the counters in the light sensitivity switch delay and the intermittent circuit and to set the output latch (U7B) in the intermittent timer. It is made up of an RC circuit (R15 and C7) and an invertor (U6C). Initially, the input to the invertor is grounded through C7 and the output of U6C is HIGH but as C7 charges, the input to U6C becomes high and the output becomes low. The output will remain low until the unit is turned off and C7 is allowed to discharge.

There are several things that should be kept in mind while assembling the PC board, the power supply, and the power control box:

1. All IC chips used in the PC board are CMOS and therefore are static sensitive. They should not be handled without the proper precaution.
2. When assembling the PC board, the order in which the parts are stuffed is not important, except in the DC embodiment. Q4 and its heatsink should be inserted last, because the heatsink covers several components.
3. Q1-Q3 should be placed flat against the copper cladding with silicon grease in between and held down with hardware.
4. Q4 should be placed on the heatsink with silicon grease in between the sink and the back of the FET.

The control center is designed to allow modular construction. The three modules are: the power supply board, the control box, and the PC control board. The order of modular assembly should be as follows:

1. Mount the transformer in the upper box (AC);
2. Place completed power supply board in the upper box and connect to the transformer via quick connect terminals;
3. Mount completed lower control box and push control cable through the right hand conduit between the upper and lower box and the power cables through the left hand conduit;
4. Connect power in to the transform (AC) to the proper spade connector on the power supply board;
5. Put crimp connectors on ends of control wires coming from lower box and place wires in connector housing;
6. Mount assembled PC board in upper box;
7. Connect power header and control header to PC board;
8. Perform alignment procedure for light sensitivity; and
9. Run diagnostic test on unit.

6. Differences Between the AC and DC PC Boards

There are a number of parts which are needed in the DC embodiment of the PC board which are not needed for the AC embodiment. These parts are part of the solar regulating circuit within the dotted lines of FIG. 6. They are as follows: L1, L2, D6, Q4, D7, TP9, U13, C19, R19, R20, R22, R21, DB, C20, TP11

There are two jumpers found in the circuit, JP3 and JP7. They have the following function:

JP3—This jumper enables the low voltage turn off circuit. While this is not needed in the AC embodiment, it will be left in to keep the speed of the motors the same for both the AC and DC embodiments (Q3 is left in the circuit) and to help eliminate the power down time of the AC embodiment due to the charge on the filter capacitor in the power supply.

JP7—This jumper is in place for both the AC and DC embodiment and is cut when the daughter board is added to either embodiment. The daughter board is intended to allow other variables, such as dissolved oxygen or temperature of the water, to switch the motors off and on.

7. Alignment and Check Out Procedure

Once the control center is assembled, the sensitivity of the photo cell needs to be adjusted and the unit needs to be tested for proper operation. The procedure for these processes are as follows:

8. Light Sensitivity Adjustment

This adjustment is done by adjusting the trim pot R4 and measuring the voltage at TP10. Place the unit in a lighting situation which simulates the light level found at dusk, or the desired turn off point. Adjust R4 with a trimmer tool until the voltage at TP10 is ½ the voltage at TP1 (nominally TP1 should be at 8 V). This may need slight adjustment when the performance of the unit is evaluated, but this initial adjustment will be very close to the final adjustment.

9. Check Out Procedure

There are several steps to evaluating the performance of the unit. First is to check all the test point and the other is to run the unit under real load conditions for several hours.

turn unit on and place in light sufficient to trip sensor (do alignment first)

go through all test points and check for values listed under Test Point Values Under Normal Operation. These evaluations should include checking the light sensor by placing hand over photocell (TP7 and TP2 should change as stated)

check +8 (+/−5%) going to motors connect a motor to the intermittent and one to the continuous return of the unit check the timing of the intermittent motors with R11 turned fully counter clockwise (5 min +/−10%)

check timing of the intermittent motors with R11 turned fully clockwise (continuous ON)

check that the unit responds properly with the bypass switch ON i.e. all functions overridden.

check to see that the light sensor bypass position shorts out the function of the light sensor plug unit into the 21 motor test setup and run 5-10 start up test on the system Test Point Descriptions are as follows in regard to FIG. 6

TP1—Vcc power for logic lights
TP2—light sensor control line (active HIGH)
TP3—battery control line (active HIGH)
TP4—intermittent control line (active HIGH)
TP5—fixed clock signal period=0.14 s
TP6—variable clock signal 0.14+s to 0.035 s TP7—output of light sensitive comparator (active LOW)

TP8—+12 VCD—+10 VDC or +14 VDC with solar option on DC model only

TP9—solar regulator bypass control DC model only

TP10—inverting input of light sensitive circuit

TP11—solar regulator reference voltage

Test Point Values Under Normal Operation are as follows:

TP1—8 VDC (+/−5%)

TP2—8 VDC (+/−10%) (light sufficient to turn unit on) <=0.3 VDC (low light)

TP3—8 VDC (+/−10%) (battery has sufficient voltage) <=0.3 VDC (battery low)

TP4—8 VDC (+/−10%) ON cycle of intermittent motors <=0.3 VDC for OFF cycle of intermittent motors TP5—8 V (+/−10%) square wave with 0.14 s period TP6—8 V (+/−10%) square wave with period that varies between 0.14+s to 0.035 s with R5. Duty cycle varies as well with R5.

TP7—<=0.3 VDC (light sufficient to turn on unit) 8 VDC (+/−10%) (low light)

TPS—+12 VCD—+10 VDC battery voltage +14 VDC (+/−10%) with solar charging circuit in strong sunlight TP9—<=0.2 VDC with bypass switch OFF 8 VDC (+/−10%) with bypass switch ON TP10—2.5—4.5 VDC depending on the amount of light falling on the photocell TP11—3 V (+/−2%) DC model only

10. Description of Daughter Board

The option of adding a plug in board at JP6 is meant to allow for future expansion of the unit. The additional board enables the continuous and intermittent motors to be switched by other variables, such as water temperature, dissolved oxygen in the water, or other detectable elements in the water that should cause a change in the feeding pattern of the fish.

The pins of JP6 provide the following interface with the mother board:

Pin 1—(input to daughter board) light sensor control line

Pin 2—(output from daughter board) control line to gate of Q3.

Pin 3—(input to daughter board) Vcc +8

Pin 4—(input to daughter board) GND

The daughter board is to take the input from Pin 1 and combine it through AND gates with control signals produced on the daughter board and then use this composite control signal to drive the gate of Q3. Once the board is installed, JP7 should be broken to route the control signal through the daughter board. The connector needed to mate with JP6 on the mother board is

SAMTEC LSB-104-D-T-S

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. An automatic fish feeding system comprising:
   a first feeder adapted to be mounted on a first tank holding water and a first school of fish;
   a second feeder adapted to be mounted on a second tank holding water and a second school of fish;
   each of said feeders including a mount for supporting said feeder adjacent the respective tank, a container for holding a supply of food, an electric motor for driving a food discharge conveyor for feeding food from said container into the tank; and
   a control system for said feeders including a power supply, a control center and a power lead connected to a station adjacent to each feeder, wherein said control center for a preselected time period, continuously distributes a first voltage to the station for each feeder and intermittently distributes a second voltage to the station for each feeder, a power connection from the electric motor of said first feeder to the station adjacent said first feeder, a power connection from the electric motor of said second feeder to the station adjacent said second feeder each station having a switch for independently connecting said power connection to one of said first voltage and said second voltage.

2. The invention of claim 1, wherein said control center includes a photocell which turns off said control center at dusk and turns on said control center at dawn.

3. The invention of claim 2, wherein said control center further comprises a switch for bypassing said photocell.

4. The invention of claim 1, wherein said power supply includes a solar panel and a DC battery.

5. An automatic fish feeding system comprising:
   first feeding means for feeding a first school of fish;
   second feeding means for feeding a second school of fish;
   each of said feeding means including
      means for mounting said feeding means adjacent a tank,
      means for holdings a supply of food, and
      means for discharging food from said holding means into said tank;
   means for controlling said feeding means including
      means for continuously supplying a first voltage to each feeding means, and
      means for intermittently supplying a second voltage to each feeding means;
      means for each feeding means for selecting between said first voltage and said second voltage;
      and means for each feeding means for independently connecting said discharging means to said selecting means.

6. The invention of claim 5, comprising means for exchanging the volume of water in said tanks approximately every 20 mins. and said means for controlling said feeding means controls said feeding means to discharge food into said tank during less than 20 mins.

7. The invention of claim 5, wherein said controlling means further includes means for sensing light, wherein said continuously supplying means and said intermittently supplying means may be turned on and off in accordance with said sensing means.

8. The invention of claim 7 wherein said controlling means further comprises means for bypassing said sensing means, said continuously supplying means and said intermittently supplying means.

9. The invention of claim 5, wherein said means for continuously supplying a first voltage comprises:
   a timing circuit outputting a fixed clock signal having a fixed period; and
   a fixed counter receiving said fixed clock signal and outputting a fixed time interval.

10. The invention of claim 9 wherein said means for intermittently supplying a second voltage comprises:
    a timing circuit outputting a variable clock signal having a variable period; and
    a variable counter receiving said variable clock signal and outputting a variable time interval.

11. The invention of claim 10 wherein said controlling means further comprises means for resetting said fixed counter and said variable counter when said fixed time interval has passed.

12. The invention of claim 10 wherein said controlling means further comprises means for turning off said discharging means when said variable time interval has passed.

13. An automatic fish feeding system comprising:
    feeding means for feeding a school of fish;
    said feeding means including
       means for mounting said feeding means adjacent a tank,
       means for holding a supply of food, and
       means for discharging food from said holding means into said tank;
    means for controlling said feeding means including
       means for continuously supplying a first voltage to said feeding means, and
       means for intermittently supplying a second voltage to said feeding means;
    means for said feeding means for selecting between said first voltage and said second voltage;
    and means for said feeding means for independently connecting said discharging means to said selecting means.

14. The invention of claim 13, wherein said controlling means further includes means for sensing light, wherein said continuously supplying means and said intermittently supplying means may be turned on and off in accordance with said sensing means.

15. The invention of claim 14 wherein said controlling means further comprises means for bypassing said sensing means, said continuously supplying means and said intermittently supplying means.

16. The invention of claim 13, wherein said means for continuously supplying a first voltage comprises:

17. The invention of claim 16 wherein said means for intermittently supplying a second voltage comprises:
    a timing circuit outputting a variable clock signal having a variable period; and
    a variable counter receiving said variable clock signal and outputting a variable time interval.

18. The invention of claim 17 wherein said controlling means further comprises means for resetting said fixed counter and said variable counter when said fixed time interval has passed.

19. The invention of claim 17 wherein said controlling means further comprises means for turning off said discharging means when said variable time interval has passed.

20. A method of automatically feeding fish comprising the steps of:
    continuously supplying a first voltage to a feeder;
    intermittently supplying a second voltage to said feeder;
    selecting between said first voltage and said second voltage, outputting a selected voltage; and
    discharging food from said feeder into a tank containing fish in response to said selected voltage.

21. The method of claim 20, further comprising the steps of:
    sensing light; and
    switching said continuously supplying and said intermittently supplying on and off in response to said sensing.

* * * * *